May 16, 1950   C. E. COLE   2,508,229
SERVO VALVE ACTUATING DEVICE FOR BOOST REGULATORS
Filed May 21, 1948   3 Sheets-Sheet 1

-INVENTOR-
CHARLES E. COLE
BY
-ATTORNEY-

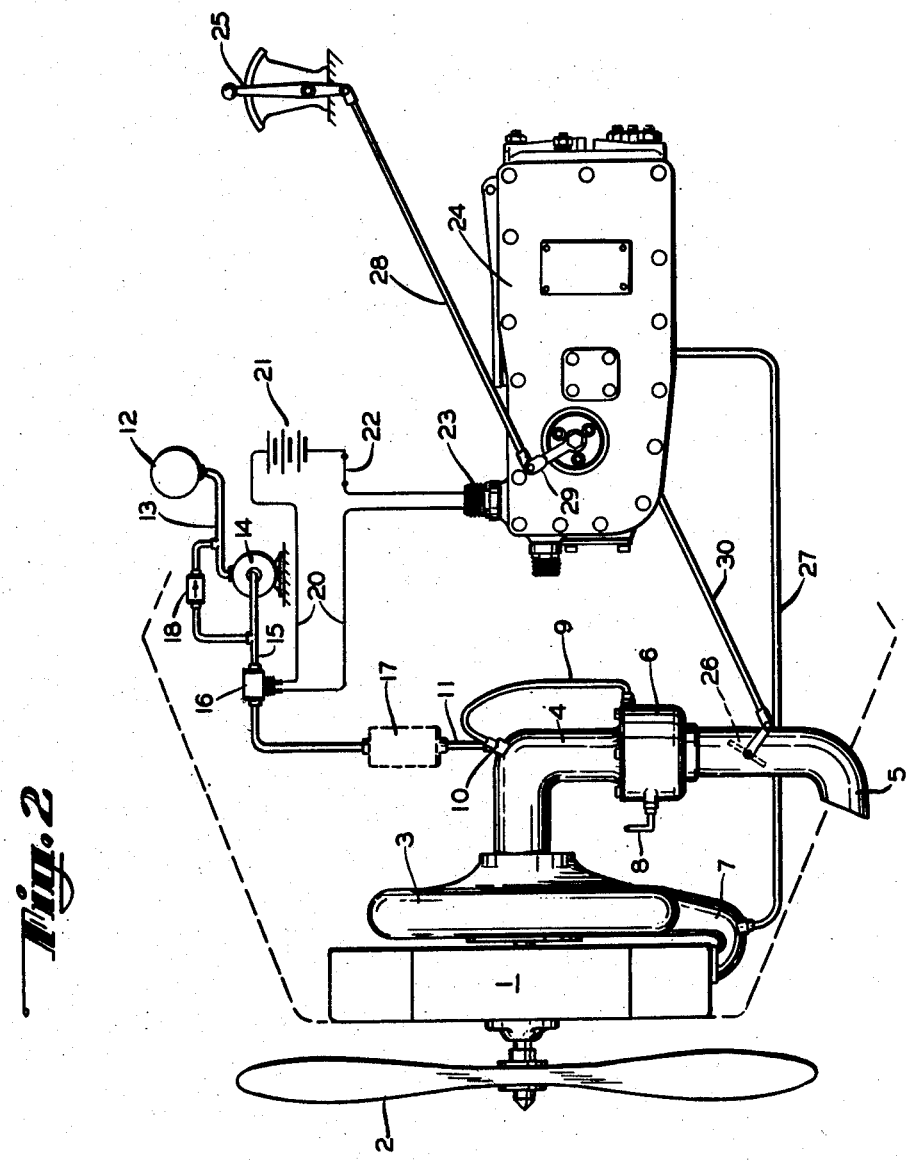

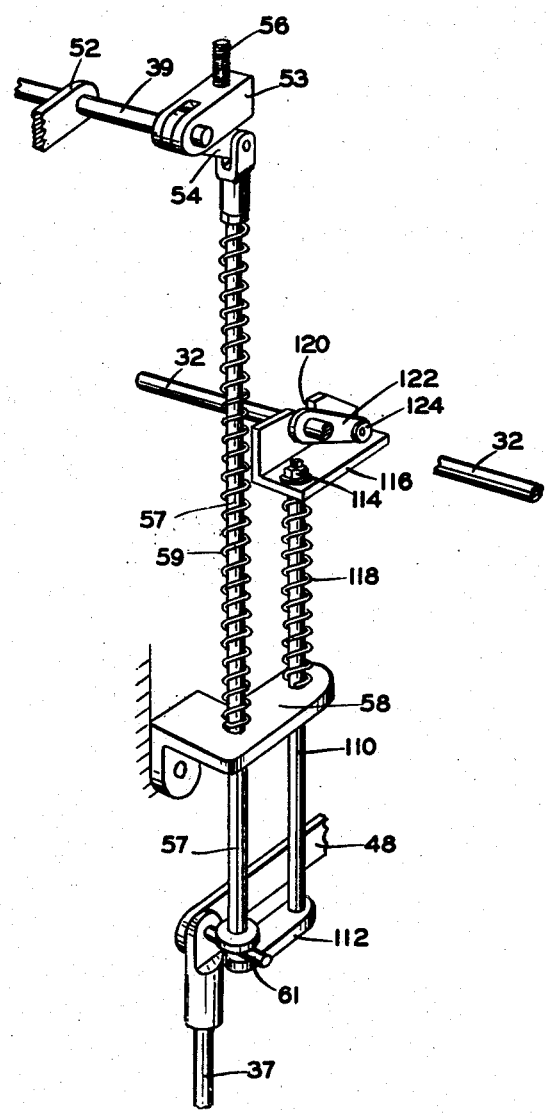

Patented May 16, 1950

2,508,229

UNITED STATES PATENT OFFICE 2,508,229

SERVO VALVE ACTUATING DEVICE FOR BOOST REGULATORS

Charles E. Cole, Tenafly, N. J., assignor to Bendix Aviation Corporation, Teterboro, N. J., a corporation of Delaware Application May 21, 1948, Serial No. 28,433

5 Claims. (Cl. 123—103)

1

The present application relates to devices and systems for the control of aircraft engines and to improvements in the regulator disclosed in the copending applications Serial No. 709,923, filed November 15, 1946, by Charles E. Cole, now U. S. Patent No. 2,444,185, granted June 29, 1948, and assigned to Bendix Aviation Corporation, and Serial No. 596,472, filed May 29, 1945, by Howard A. Alexanderson and Robert Z. Hague.

More particularly the present invention relates to a boost regulator including a hydraulic motor, servo valve and manually operated means for physically disturbing the servo valve in the event of obstruction or upon the servo valve becoming jammed.

An object of the present invention is to provide a novel releasable valve actuating element interconnected with the control linkage of the boost control in such a manner that the servo valve may be readily dislodged under manual control upon obstruction to movement of the servo valve.

Another object of the invention is to so arrange the valve actuating element as to avoid interference with the operation of the servo valve during normal operation and in such a manner that the servo valve may be loaded in a servo decrease direction only when the pilot's control is set at or near full decrease position.

In the servo valve dislodging device heretofore disclosed and claimed in the U. S. Patent No. 2,444,185 the dislodging device is controlled jointly by the position of the throttle valve and pilot's control lever. However, the latter dislodging device may come into operation at too high a throttle angle or open throttle position, and therefore, when sticking occurs during ground operation, excessive power may result before the dislodging device may become effective in dislodging the servo valve.

Accordingly, an object of the invention is to provide an improved mechanism to dislodge the servo valve at low throttle angles when the pilot's control lever is moved to a power decrease position.

Another object of the invention is to provide novel spring means to load the servo valve in the servo decrease direction so as to prevent sticking of the valve in the oil metering bushing in the servo increase position. Moreover in order to

2 avoid interference with the servo valve in the servo increase position during normal automatic operation, the valve loading means is interconnected with the pilot's control lever position so that the load is applied only when the pilot's control lever is set at or near a full power decrease position.

The above and other objects and features of the invention will appear more fully hereinafter from a consideration of the following description taken in connection with the accompanying drawings wherein one embodiment of the invention is illustrated by way of example.

In the drawings:

Figure 1 is an exploded schematic view of a boost control embodying the dislodging device disclosed and claimed in the U. S. Patent No. 2,444,185.

Figure 2 is a schematic view of an engine control system with the boost control in operative relation.

Figure 3 is a fragmentary view of the improved dislodging mechanism which forms the subject matter of the present application.

Figure 1:
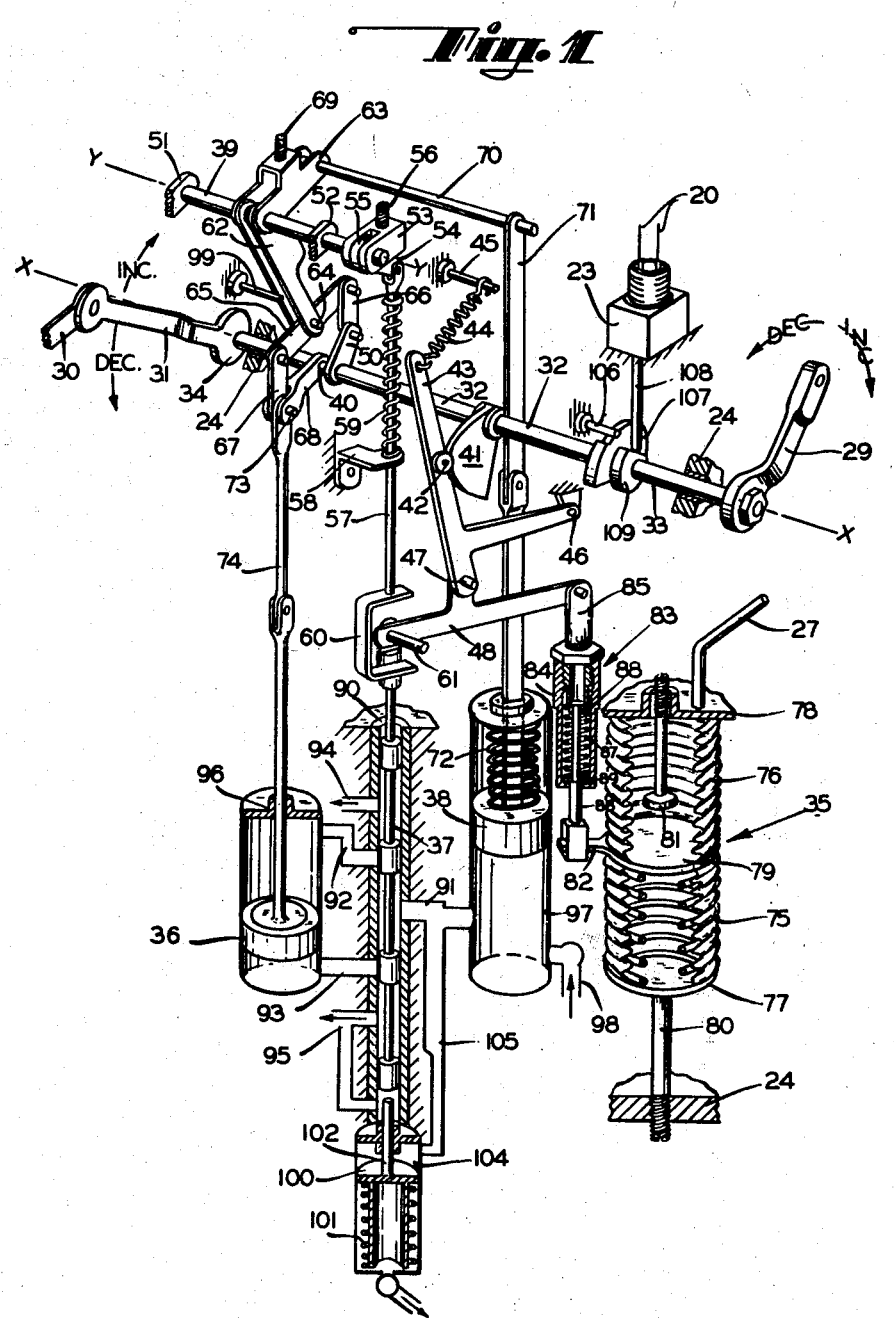

Referring to the drawing of Figure 2, there is shown an aircraft engine 1 driving a propeller 2 and a supercharger or blower 3. The supercharger 3 has an air inlet conduit 4 including an air scoop 5 and a carburetor 6 of conventional type. The outlet of the supercharger 3 is connected to an intake manifold 7 of the engine 1.

A conduit 8 leads to the carburetor 6 from a suitable source of fuel, while a second conduit 9 conducts fuel from the carburetor 6 to a suitable nozzle 10. There is also connected to the nozzle 10 a conductor 11 which leads from a supply of anti-detonant fluid such as water, water-alcohol or other suitable fluid well known in the art.

There is provided a tank 12 for carrying the anti-detonant fluid. The tank 12 is connected by a conduit 13 to a fluid pump 14 which has an outlet conduit 15. The conduit 15 leads through an electromagnetically operated control valve 16 to a regulating valve 17 of conventional type to the conduit 11.

The control valve 16 is arranged to permit the passage of the anti-detonant fluid through the conduit 15 upon energization of its control electromagnet. Upon deenergization of the electromagnet controlling the valve 16 the conduit 15 is closed to the passage of the anti-detonant fluid. A by-pass valve 18 in the latter case permits the return of the fluid from the conduit 15 to the inlet conduit 13 of the pump 14.

A circuit for energizing the electromagnet for control of the valve 16 is indicated generally by the numeral 20 and includes a source of electrical energy 21, a main control switch 22 and a second switch 23 carried in an automatic boost control 24 as will be explained hereinafter.

The automatic boost control 24 operates so as to maintain the pressure in the intake manifold 7, according to the setting of a pilot's control lever 25, by regulating a throttle valve 26 in the conduit 4. The intake manifold 7 is connected to the automatic boost control 24 through a conduit 27. The pilot's control lever 25 is connected to the automatic boost control by a linkage 28 and arm 29, while the throttle valve 26 is operatively adjusted by the automatic boost control 24 through a link 30 and an arm 31 shown in Figure 1.

The mechanism enclosed within the housing of the automatic boost control 24, as shown schematically in Figure 1, includes a cam shaft 32; a main control shaft 33 fixedly connected to the arm 29; a throttle control shaft 34 fixedly connected to the arm 31; a pressure responsive bellows assembly 35; an operating piston 36; a selector valve 37; a manual control piston 38; and a manual control shaft 39. The motion of the various operating linkages is transmitted to, or from, the four horizontal shafts seated in the unit 24. Three of these shafts, the main control shaft 33, the cam shaft 32 and the throttle control shaft 34 extend along a common axis X—X running through the main cover and the rear wall of the housing of the unit 24. The fourth, the manual control shaft 39, extends along a parallel axis Y—Y above and to one side of the axis X—X.

*Cam shaft and cam follower mechanism*

The throttle control shaft 34 extends through a bearing in the rear wall of the unit 24 and its external arm 31 is connected by link 30 to the throttle 26.

The cam shaft 32 is supported at its ends, one end being inserted at 40 into a co-axial bore in the driving head of the throttle control shaft 34 in which it turns independently. The other end of the shaft 32 is keyed into the slotted end of the main control shaft 33 to which the cam shaft 32 is thus drivingly engaged.

A selector cam 41 is mounted upon, and pinned to the cam shaft 32. As the cam shaft 32 is rotated, the cam 41 pivots about the axis X—X and presents a variable profile to a follower 42 carried by an L-shaped cam follower lever 43. The upper end of the cam follower lever 43 is attached to a spring assembly 44 anchored to a stud 45 in the housing of the unit 24. The side arm of the L-shaped cam follower lever 43 swivels on a pivot pin 46 carried by the inner casing of the unit 24.

The lower portion of the cam follower lever 43 is pivotally connected at 47 to a walking beam 48 so that a change in the setting of the cam 41 causes the cam follower lever 43 to swivel accordingly, resulting in a corresponding change in the setting of the walking beam 48. The walking beam 48 is coupled at one end to the pressure responsive bellows assembly 35 and at the other end to the selector valve 37 as will be explained hereinafter under the heading "Pressure responsive bellows assembly."

The cam shaft 32 also has a crank arm 50 pinned at the end adjacent to the throttle control shaft 34. The crank arm 50 is link coupled to the manual control mechanism described below.

*Manual control mechanism*

The manual control shaft 39 is supported by bored lobes 51 and 52 which project internally from the side wall of the housing of the unit 24, one lobe 52 at about the center of the shaft 39 and the other lobe 51 at the rear end of the shaft 39. A manual control driving head 53 and a driving lever 54 are mounted on the front end of the shaft 39, to which the driving head 53 is pinned. The driving lever 54 is freely mounted on the shaft 39 within a slot 55 in the driving head 53, so that as the driving head 53 swivels downward or is rotated in a clockwise direction by the action of the shaft 39, a thrust is transmitted to the driving lever 54 by a set screw 56 in the driving head 53, which bears upon the driving lever 54. The end of the driving lever 54 is pin coupled to a push rod 57 which is slidably mounted in a bracket 58. The bracket 58, riveted to the inner wall of the unit 24, guides the push rod 57 and supports a coil spring 59 against which the push rod 57 reacts. The spring 59 biases the push rod 57 in an upward direction and the driving lever 54 in a counterclockwise direction into engagement with the set screw 56. There is affixed at the lower end of the push rod 57 a hook-like actuating element 60 which is arranged to cooperate with a pin 61 projecting from the head of the selector valve 37 for a purpose described hereinafter under the heading "Selector valve."

A driving arm 62 is affixed to the manual control shaft 39 between arms of a manual control piston linkage arm 63, which is freely mounted on the shaft 39. The driving arm 62 is pin coupled at 64 to the center of a floating lever 65. The ends of the floating lever 65 are in turn coupled by links 66 and 67 to the crank arm 50 of cam shaft 32 and a crank arm 68 affixed to throttle control shaft 34.

Rotation of the cam shaft 32 may be transmitted to the manual control shaft 39 through the floating lever 65 and driving arm 62. The manual control piston linkage arm 63 is mounted so that it swivels freely upon the manual control shaft 39. The arm 63 carries an adjustable set screw 69 adapted to contact a web portion of the manual control shaft driving arm 62 and thereby restrain movement of the arm 62 under certain conditions of operation. The swivelling end of the arm 63 is coupled by a pin 70 to a piston rod 71 of the manual control piston 38 biased under tension of a spring 72 in a downward direction and the operation of which is described hereinafter under the heading "Manual control piston." The manual control mechanism is claimed generically in the copending application Serial No. 12,784, filed March 3, 1948, by Howard A. Alexanderson and Robert Z. Hague as a division of application Serial No. 596,472, filed May 29, 1945, by Howard A. Alexanderson and Robert Z. Hague and assigned to Bendix Aviation Corporation.

*Throttle control shaft*

The throttle control shaft 34 is seated in a bushing installed in the rear wall of the housing of the unit 24. As previously described, the crank arm 68 affixed to the shaft 34 at the internal end thereof is link coupled to the floating lever 65 through which the shaft 34 may be actuated during manual control. This crank arm 68 is also coupled by pin 73 and link 74 to the operating piston 36, by which the throttle control shaft 34 is driven during automatic control. The throttle control lever 31 is fixedly mounted on the external end of the throttle control shaft 34.

Pressure responsive bellows assembly

As previously described, the cam follower lever 43 is coupled to the walking beam 48 by a pin 47 so that movement of the cam follower lever 43 changes the pivotal position of the walking beam 48. The walking beam 48 is coupled at one end to the selector valve 37, and at the other end to the bellows assembly 35.

The bellows assembly consists of a spring-loaded evacuated bellows 75 and a pressure bellows 76 which are enclosed between end plates 77 and 78 and separated by a center plate 79. The bellows assembly 35 is installed in the housing chamber of the unit 24 where it is supported at its top by the end plate 78 affixed to the inner wall of the unit 24 and at its bottom by a bellows support 80 which likewise affixes the end plate 77 to the inner wall of the unit 24. The conduit 27 opens into the pressure bellows 76 so that the position of the center plate 79 varies with changes in intake manifold pressure. An adjustable bellows stop 81 extends into the pressure bellows chamber 76 and determines the minimum pressure, or lockout setting. The lock out feature is claimed generically in U. S. Patent No. 2,453,650, assigned to Bendix Aviation Corporation, and granted November 9, 1948 on an application Serial No. 550,646, filed August 22, 1944, by Howard A. Alexanderson as a division of application Serial No. 417,855, filed November 4, 1941, and now U. S. Patent No. 2,358,845, granted September 26, 1944, and assigned to Bendix Aviation Corporation.

The bellows stop 81 projects above the mounting plate 78 where it may be secured in position by a suitable cap and jam nut not shown. The bellows support 80 may also be in the form of an adjustable post or screw which may be adjusted externally so as to provide a convenient means for varying the initial pressure setting of the bellows assembly 35.

The bellows 75 is formed of equal size to the bellows 76 so as to compensate for changes in atmospheric pressure acting externally upon the bellows 76.

Resilient link assembly

The bellows center plate 79 has a connecting arm 82 which is connected to the end of a resilient link assembly 83. The assembly 83 includes a tube 84 connected by a link 85 to one end of the walking beam 48 and a plunger 86 slidably mounted in the tube 84 and connected to the arm 82. The plunger 86 is loaded by a coil spring 87 which bears at opposite ends on plates 88 and 89 slidably mounted on the plunger 86 and within the tube 84. The plates 88 and 89 are biased by the spring 87 into engagement with the inner portions of the tube 84 so as to provide a resilient means of relief in case the servo valve 37 is either pushed down or pulled up mechanically.

The resilient link assembly 83 is thus arranged so as to prevent unnecessary strain from being applied to the bellows assembly 35, as upon the actuating element 60 engaging the pin 61 of the selector valve 37 in upward or downward manual adjustment as described hereinafter. This feature is claimed generically in U. S. Patent No. 2,453,652, assigned to Bendix Aviation Corporation, and granted November 9, 1948, on an application Serial No. 783,237, filed October 31, 1947, by Howard A. Alexanderson as a continuation of now abandoned application Serial No. 508,724, filed November 2, 1943, and assigned to Bendix Aviation Corporation.

Selector valve

The selector valve 37 which is connected to the bellows assembly 35 through the walking beam 48 and resilient link assembly 83, travels in a bushing 90 which is heat shrunk into a bore of the housing of the unit 24. Port holes through the bushing 90 connect a passage 91 leading from a source of oil pressure to the inlet ports 92 or 93 of the chamber for the piston 36. Valve lands at fixed positions along the valve stem 37 cover the port holes 92 and 93 of the bushing when the valve 37 is in a neutral position. When the selector valve 37 is actuated through its link coupling with bellows walking beam 48 or when it is pushed downward or upward by the thrust of the manual control push rod 57 from the neutral position, the lands of the valve stem 37 uncover the port holes 92 or 93, thereby permitting the flow of pressure oil through the bushing orifices to the respective inlet port 92 or 93 of the operating chamber of the piston 36 where it actuates the piston 36 as described in the following paragraph. Drain oil is passed out through outlet passages 94 or 95.

Operating piston assembly

The operating piston assemly 36 travels within a housing chamber having a necked opening 96 in its top through which the piston rod extends. Pressure oil to actuate the piston is fed through passages 92 or 93 from the selector valve 37. These passages lead to ports opening into the chamber near the upper and lower limits of travel of the piston 36. Upon adjustment of the valve 37 upward from the neutral position, oil pressure is applied through passage 91 and upper port 92 so as to act against the top of the piston 36, forcing it downward, while the lower port 93 is opened to the oil drain passage 95. Conversely upon adjustment of the valve 37 downward from the neutral position oil pressure is applied through passage 91 and lower port 93 so as to act against the bottom of the piston 36, forcing it upward, while the upper port 92 is open to the oil drain passage 94. Motion of the operating piston 36 is transmitted through link 74 to arm 68 and thereby to the throttle control shaft 34 so as to control the position of the throttle 26.

Manual control piston

The manual control piston 38 travels in the upper half of a housing chamber 97 from which leads the passage 91 and into which housing chamber opens a passage 98 leading from the engine oil pressure supply system or other suitable source of pressure. The manual control piston rod 71 couples the piston 38 to the manual control linkage assembly through the pin 70 and arm 63. The spring 72 seated between the top of the piston 38 and the top of the chamber 97 in which it travels, biases the piston 38 in a downward direction. The manual control piston spring 72 applies sufficient force to drive the piston 38 downward into the manual control position upon the engine oil pressure decreasing below a predetermined minimum value of, for example, thirty p. s. i. In the latter downward position of the piston 38 the arm 63 is adjusted in a clockwise direction to its extreme position at which the set screw 69 contacts the arms 62 so as to limit free movement of the arm 62 in a counterclockwise direction, while but limited movement of the arm 62 in a clockwise direction may be effected due to a stop pin 99.

There is further provided at the lower end of the selector valve 37 a piston 100 having a spring 101 and a stem 102. The piston 100 is biased by the spring 101 in an upward direction and the stem 102 is arranged to cooperate with the lower end of the selector valve 37.

The piston 100 is slidably mounted in a chamber 104 into which opens at the upper end a passage 105 leading from the passage 91. Upon the engine oil pressure decreasing below the aforenoted predetermined minimum value, the spring 101 applies sufficient force to the piston 100 so as to force the stem 102 into contacting relation with the lower end of the selector valve 37 and force the selector valve 37 upward from a neutral position and thereby open passage 93 to the drain 95 and the passage 92 to the passage 91. This permits manual movement of the piston 36, together with the throttle 26 through arm 29, shaft 33, shaft 32, arm 50, link 66, walking beam 65 pivoted on pin 64, link 67, arm 68, throttle shaft 34, arm 31, and link 30.

When oil pressure exceeding the predetermined minimum value of, for example, thirty p. s. i. is fed into the chamber 97 through passage 98, the force of the oil pressure drives the piston 38 upward, thereby moving the manual control piston linkage arm 63 upward and freeing the manual control shaft driving arm 62 from contact with the set screw 69. Moreover, the latter increased pressure likewise acts upon the piston 100 forcing the same into the downward position and the stem 102 out of contacting relation with the selector valve 37 so that normal automatic control of the piston 36 may be effected. The manual control piston arrangement, effective upon oil pressure failure, is claimed generically in the copending application Serial No. 596,472, filed May 29, 1945, by Howard A. Alexanderson and Robert Z. Hague and assigned to Bendix Aviation Corporation.

*Main control shaft*

The main control shaft 33 is mounted in a sleeve bearing in the cover of the unit 24 in such a position as to engage the keyed end of the cam shaft 32. Rotation of the shaft 33 is limited by a main control shaft stop pin 106 affixed to the internal wall of the unit 24 and cooperating with a flange 107 affixed to the internal end of the shaft 33. The lever 20 is affixed to the external end of the shaft 33 for operation by the pilot through link 28 and the pilot's control lever 25, as shown in Figure 2.

*Water injection control*

The switch 23 for controlling the electric circuit 20 previously described, may be in the form of a suitable spring operated snap switch installed in the upper portion of the main cover assembly of the unit 24.

The switch 23 is actuated by a push rod 108 operated by a cam 109 affixed to the control shaft 33 and arranged so as to close the electrical circuit 20 through the switch 23 when the manifold pressure selected by movement of the lever 29 corresponds to a predetermined value of, for example, in excess of 52.25 inches Hg absolute (corresponding to approximately 59 degrees of pilot's control lever angle).

Upon closing the switch 23 by such adjustment of the pilot's control lever 25, operation of the water injection system is effected.

*Operation*

The unit 24 operates during normal automatic control to maintain the pressure in the intake manifold 7, according to the setting of the pilot's control lever 25. This function is effected by the operation of the selective mechanism 41—43 and the automatic control mechanism 35, 48, 37 and 36.

A manual control is provided for engine starting, idling and taxiing. The latter manual control range is sufficient to obtain power for such purposes and is effected through operation of the lock-out screw 81 as hereinafter described. Above a predetermined minimum angle of the throttle 26 the manifold pressure is normally regulated through the automatic control mechanism, provided that the required oil pressure is supplied to the unit 24. Manual control may also be effected through operation of the piston 38 so as to permit manual control in case of failure of the oil pressure supplied to the unit 24. The latter manual control range is sufficient to obtain normal power for take-off engine speed at sea level.

The selective mechanism is centered about the cam 41 and its associated follower linkage 43. Movement of the pilot's control lever 25 rotates the cam shaft 32, through the main shaft 33 to which it is coupled, and causes the selector cam 41 to swivel around the shaft axis X—X, thereby presenting a variable profile to the cam follower 43. When the pressure setting is increased by clockwise movements of the arm 29, the cam 41 swivels upward causing the cam follower 43 to pivot about 46 in a counterclockwise direction away from the cam shaft 32. This movement of the cam follower 43 causes the walking beam 48, to which it is pin coupled at 47, to swivel about the pivot pin 47 and move the selector valve 37 downward in a pressure increasing direction so as to thereby increase the pressure setting of the bellows assembly 35. Conversely movement of the arm 29 in a counterclockwise direction decreases the pressure setting.

After the selective mechanism has adjusted the position of the walking beam according to the setting of the pilot's control lever, the automatic control mechanism operates to maintain the manifold pressure according to this setting.

When the pressure at the intake manifold 7 decreases below the selected setting, the deficiency is sensed by the pressure bellows 76 which contracts accordingly, thereby moving the center plate 79 upward. The motion of the center plate 79 is transmitted through the resilient link assembly 83 to the walking beam 48 which pivots on the pin 47 into a position whereby the selector valve 37, at the opposite end of the walking beam 48, is thrust downward to a pressure increasing position. In the latter position of the selector valve 37, the passage 91 is open to the passage 93 leading to the lower end of the operating piston chamber, and oil pressure is thus applied against the lower face of the operating piston 36. Simultaneously the upper passage 92 of the operating piston chamber is opened to the drain passage 94, so that the piston 36 moves upward in its chamber. This motion is transmitted through the piston rod 74 to the throttle shaft 34 which is thus actuated in a clockwise direction to increase the opening of the throttle valve 26 and thereby increase the pressure at the intake manifold 7. Conversely, when the manifold pressure increases to a value above the selected setting, the pressure bellows 76 senses the increased pressure and causes the operating piston 36 to move upward in a direction which causes the throttle 26 to move in a closing direction and decrease the manifold pressure.

In either case, when the pressure at the intake manifold 7 is increased or decreased to the value required by the selective setting, the pressure bellows 76 reacts to close the selector valve ports 92 and 93, thus returning the control mechanism to the stable position until a further change in flight conditions, or a new setting of the pilot's control lever 25, requires a corresponding readjustment of the manifold pressure.

At pressure settings demanding a value of manifold pressure for which the throttle valve 26 would tend to assume a position at less than a prescribed minimum angle, the boost control automatically shifts into the manual control range. Within the latter low pressure setting range the automatic lock-out 81 engages the center plate 79 and prevents contraction of the bellows 76 sufficiently to move the valve 37 to a neutral position at selected pressures below a predetermined minimum value and the bellows assembly 35 in effect continuously calls for less pressure.

Thus, upon adjustment of the cam 41 to within the low pressure lock-out range, the piston 36 tends to move downwardly until the throttle valve 26 assumes a position approaching the prescribed minimum angle, whereupon the arm 68 is moving in a counterclockwise direction so as to actuate the link 67 downwardly together with the attached end of the floating lever 65 so as to actuate the manual control shaft driving arm 62 in a clockwise direction to transmit motion to the manual control shaft 39. Such rotation of the shaft 39 pivots the manual control driving head 53 and lever 54 downward thereby driving the push rod 57 downward. At the prescribed minimum angle the push rod 57, in turn, thrusts downward on the raised selector valve 37 returning the same to a neutral position against the tension of the resilient linkage 83.

Further closing movement of the throttle valve 26 is effected as a direct follow-up of movement of the arm 29 in a counterclockwise or pressure decreasing direction. Thus such further movement will cause the arm 50 of the cam shaft 32 to move in a counterclockwise direction raising link 66 and the attached end of the walking beam 65 so as to move arm 62 in a counterclockwise direction, whereupon spring 59 biases the push rod upward so as to release the walking beam 48 under force of the tension spring 87 of the resilient linkage 83 to move the valve 37 in an upward direction from the neutral position. The latter adjustment of the valve 37 will in turn cause piston 36 to move downward so as to further close the throttle 26 and to return the selector valve 37 to a neutral position through action of the push rod 57, which is then moved downward by the action of the driving head 53 and lever 54 upon the downward movement of the piston 36.

In the aforenoted manual range, movement of the arm 29 to increase the manifold pressure rotates the cam shaft arm 50 clockwise. The throttle control shaft 34 is momentarily fixed, and the downward thrust of the cam shaft arm 50 actuates the manual control shaft driving arm 62 in a clockwise direction to transmit the motion to the manual control shaft 39. The rotation of this shaft pivots the manual control driving head 53 and lever 54 downward thereby driving the push rod 57 downward. The push rod 57, in turn, thrusts downward upon the selector valve 37, pushing it into the increase pressure position whereby oil pressure is fed to the operating piston 36 upward to increase the opening of the throttle 26 and simultaneously to actuate the arm 62 in a counterclockwise direction so that the selector valve under tension of the resilient link 83 may be returned to a neutral position.

If the oil pressure supply to the unit is insufficient due to oil pressure supply failure or other cause, the piston 38 under force of the spring 73 actuates the arm 63 in a clockwise direction so as to limit movement of the driving arm 62. In this case, the pivot 64 is fixed and the floating lever 65 pivots about an axis which directly moves the throttle control shaft 34. The pivotal action of the cam shaft arm 50 is transmitted through the linkage system composed of the floating lever 65 and the two connecting links 66 and 67, to the throttle shaft 34 which rotates accordingly. The piston 36 may be moved manually due to the action of the piston 100 in biasing the valve 37 in an upward direction upon such pressure failure.

During normal operation when the pilot's control lever 25 is moved beyond a predetermined angle of, for example, 59 degrees and corresponding, for example, to a pressure setting of 52.25 inches Hg absolute, the switch cam 109 mounted on the main control shaft 32 actuates the microswitch 23 so as to close the circuit 20 and thereby automatically turns on the water injection system.

A novel feature of the present invention is the provision on the push rod 57 of the hook-like actuating element 60. The actuating element 60 is so arranged that the valve 37 may be readily dislodged thereby should the valve 37 become jammed or stuck in the downward or pressure increase position and thus rendering the control unit 24 unresponsive to movements of the pilot's control lever to decrease power.

In such case, with the piston 36 at the extreme upward pressure increase position and the valve 37 jammed in the downward position, dislodgment of the valve 37 is accomplished by manually moving the pilot's control lever 25 to the full pressure decrease position. The latter action effects movement of the arm 29 in a counterclockwise direction which imparts a corresponding counterclockwise movement to the arm 50 moving the link 66 and floating lever 65 upward so as to in turn impart a counterclockwise movement to the arm 62.

With the piston 36 at the extreme upward or pressure increase position, the latter counterclockwise movement imparted by the arm 50 to the arm 62 will in turn cause the driving head 53 to swivel sufficiently upward as to permit the rod 57 under the biasing force of the spring 59 to cause the hook-like actuating element 60 to move upward so as to engage the pin 61 projecting from the head of the valve 37 and effect dislodgment of the valve 37 from its downwardly stuck position. Thus the dislodging mechanism in the latter case is jointly affected by the position of the throttle valve and pilot's control lever.

In order to avoid interference with the valve 37 in "servo increase" positions during normal automatic operation, the valve disturbing element 60 is interconnected with the control linkage in such a manner that the valve 37 is disturbed from "servo increase" position only under the condition of full throttle servo position and with the pilot's control at or near "full decrease" position.

By virtue of the geometry of the particular linkage under consideration, a definite position is determined for the arm 62 for any specific positions of the throttle control arm 68 and the pilot controlled arm 50. The valve disturbing element 60 is then mechanically connected to the arm 62 through shaft 39, head 53, lever 54, push rod 57 and spring 59 and so proportioned as to create an interference tending to displace the valve 37 in the "pressure decrease" direction, upon the arm 68 being at full throttle position, and the arm 50 being at or near "full decrease" position. The force applied to the valve 37 is supplied by the coil spring 59 acting upon the valve disturbing element 60 through the push rod 57. It will be seen that the resilient linkage 83 permits movement of the servo valve 37 relative to the pressure responsive mechanism 35 without applying an undue strain on the mechanism.

It will be noted, however, from the latter arrangement that before dislodgment of the selector valve 37 may be effected the throttle valve must be adjusted to a position approaching wide open throttle at which excessive power may result before the dislodging device may come into operation.

Improved dislodging mechanism

In order to avoid the foregoing difficulties the novel dislodging mechanism shown in Figure 3 was devised for use in a combination such as shown in Figure 1 in place of the valve disturbing element 60.

In the drawing of Figure 3 corresponding numerals indicate corresponding parts to those described with reference to Figure 2.

The improved mechanism of Figure 3 includes an additional actuating rod 110 slidably mounted in the bracket 58 and including at one end a hook-like actuating element 112 arranged to releasably engage pin 61 of the servo valve 37. The opposite end of the rod 110 is fastened by a nut 114 to a movable plate 116. A spring 118 biases the rod 110, together with the actuating element 112 and plate 116 in an upward direction.

The push rod plate 116 has a slot 120 formed therein and through which extends the pilot's control shaft 32. The slot 120 permits movement of the plate 116 relative to the shaft 32. Affixed to the shaft 32 is an arm 122 having an eccentric adjustment 124 which is arranged to engage the push rod plate 116 so as to limit the movement thereof under the biasing force of the spring 118.

It will be seen then that the improved dislodging mechanism includes the spring 118 which loads the servo valve 37 against the push rod actuator 57. Accordingly, the throttle angle is restricted to the value established by the manual linkage. Actuation of the servo valve 37 by the manual linkage is accomplished by overcoming the spring load. The spring loaded rod 110 is interlocked with the pilot's control shaft 32 angular position through the arm 122 and eccentric 124 so that the servo valve 37 is normally free for automatic operation above the aforenoted limited range of operation of the pilot's control.

The arm 122 is thus so arranged that the biasing force of spring 118 is applied through pin 61 to the servo valve 37 in a pressure decreasing direction only when the arm 122 is set by the pilot's control lever at or near a full pressure decrease position and independent of the position of the throttle valve. Thus the latter arrangement permits dislodgment of the servo valve 37 before the throttle valve approaches an excessively wide open position.

Although only one embodiment of the invention has been illustrated and described, various changes in the form and relative arrangement of the parts may be made to suit requirements.

What is claimed is:

1. For use with a supercharged aircraft engine having an air intake manifold and a throttle valve for controlling the induction pressure; a boost regulator including hydraulic power means for controlling the throttle valve, a servo valve for controlling the power means, a pressure sensitive device for actuating said servo valve upon changes in the induction pressure, means for changing the datum of said boost regulator, means for operating said datum changing means, releasable means for dislodging said servo valve when stuck in an induction pressure increase position, and means connecting said dislodging means directly to said operating means in such a manner as to effect actuation of said dislodging means only when said operating means has been adjusted to a substantially extreme induction pressure decrease position.

2. A boost regulator comprising a hydraulic power means, a valve for controlling the power means, a pressure sensitive device for actuating said valve, a releasable element for engaging said valve, spring means for actuating said element into engagement with said valve so as to actuate said valve in one sense, manually operable means, means for controlling said spring actuating means, and means operatively connecting the control means directly to said manually operable means for the sole operation of said control means.

3. The combination defined by claim 2 including a second element operated by said power means for actuating said valve in a pressure increase direction upon adjustment of said throttle valve to a predetermined pressure decrease position, and second spring means for biasing said second element out of an actuating relation with said valve.

4. For use with a supercharged aircraft engine having an air intake manifold and a throttle valve for controlling the induction pressure of said engine; a boost regulator including hydraulic power means for regulating the throttle valve, a servo valve for controlling the power means, a pressure sensitive device for actuating said servo valve upon changes in induction pressure, means for changing the datum of said boost regulator, means for operating said datum changing means, a pin projecting from one end of said servo valve, a hook-like element to engage said pin for dislodging said servo valve when stuck in an induction pressure increase position; spring means to actuate said element to effect such dislodgment of the servo valve, an arm for controlling said spring actuating means, means connecting said operating means to said arm in such a manner as to cause such dislodgment of the servo valve only when said operating means has been adjusted to a substantially extreme induction pressure decrease position.

5. For use in a boost regulator having hydraulic power means for regulating a throttle valve, a servo valve for controlling the power means, a pressure sensitive device for actuating said servo valve, means for changing the datum of said boost regulator and means for manually operating said datum changing means; the combination comprising an element to releasably engage said servo valve, spring means to bias said element in a direction to effect such engagement and dislodgment of said servo valve, a member affixed to said element and biased by said spring means in said direction, an arm bearing upon said member and movable in a direction in opposition to the biasing force of said spring means, said arm directly controlled by said manual operating means so as to permit said member to move under the biasing force of said spring means so as to cause said element to effect dislodgment of the servo valve only when the manual means has been positioned within a predetermined limited range of adjustment

CHARLES E. COLE.

REFERENCES CITED

The following references are of record in the file of this patent:

UNITED STATES PATENTS

| Number | Name | Date |
|---|---|---|
| 2,403,398 | Reggio | July 2, 1946 |
| 2,453,651 | Mock | Nov. 9, 1948 |